US008418237B2

(12) United States Patent
Barbour et al.

(10) Patent No.: US 8,418,237 B2
(45) Date of Patent: Apr. 9, 2013

(54) RESOURCE ACCESS BASED ON MULTIPLE CREDENTIALS

(75) Inventors: Marc R. Barbour, Woodinville, WA (US); Carl M. Ellison, Seattle, WA (US); Kristjan E. Hatlelid, Sammamish, WA (US); Janet L. Schneider, Bellevue, WA (US); Pieter R. Kasselman, Dublin (IE)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 12/582,185

(22) Filed: Oct. 20, 2009

(65) Prior Publication Data

US 2011/0093939 A1   Apr. 21, 2011

(51) Int. Cl.
*H04L 29/06* (2006.01)
(52) U.S. Cl.
USPC .................................. 726/7; 726/19
(58) Field of Classification Search .............. 726/5, 7, 726/6, 19, 18, 10
See application file for complete search history.

(56) References Cited

U.S. PATENT DOCUMENTS

| 6,148,401 | A * | 11/2000 | Devanbu et al. ............. 713/170 |
| 6,263,434 | B1 | 7/2001 | Hanna et al. |
| 6,697,947 | B1 * | 2/2004 | Matyas et al. ............... 713/182 |
| 7,039,812 | B2 | 5/2006 | Kawan et al. |
| 7,178,025 | B2 | 2/2007 | Scheidt et al. |
| 7,325,128 | B2 | 1/2008 | Wood et al. |
| 7,496,952 | B2 | 2/2009 | Edwards, Jr. et al. |
| 2002/0144149 | A1 | 10/2002 | Hanna et al. |
| 2003/0140233 | A1 | 7/2003 | Samar |
| 2003/0200172 | A1 | 10/2003 | Randle et al. |
| 2005/0268107 | A1 | 12/2005 | Harris et al. |
| 2006/0026671 | A1 * | 2/2006 | Potter et al. ...................... 726/7 |
| 2006/0224590 | A1 | 10/2006 | Boozer et al. |
| 2007/0186106 | A1 | 8/2007 | Ting et al. |
| 2008/0289032 | A1 * | 11/2008 | Aoki et al. ...................... 726/19 |
| 2009/0113530 | A1 * | 4/2009 | Brainard et al. ................. 726/6 |
| 2010/0275259 | A1 * | 10/2010 | Adams et al. ................... 726/19 |

OTHER PUBLICATIONS

"International Search Report", Mailed Date: Jun. 8, 2011, Application No. PCT/US2010/050278, Filed Date: Sep. 24, 2010, pp. 8.
"The Need for Application Intelligence", retrieved at <<https://partner.microsoft.com/40034427>>, Jun. 2006, pp. 15.
"Authentication in an Internet Banking Environment" retrieved at <<http://www.ffiec.gov/pdf/authentication_guidance.pdf>>, Federal Financial Institutions Examination Council, pp. 14.
"FingerPIN Launches the World's First Sequential Multi-Fingerprinting Technology for Biometric Security", retrieved at <<http://news.thomasnet.com/fullstory/801226>>, Nov. 9, 2006, pp. 5.

* cited by examiner

*Primary Examiner* — Edward Zee
(74) *Attorney, Agent, or Firm* — Wolfe-SBMC (57) ABSTRACT

A collection of multiple user credentials each associated with one of multiple different users is obtained at a device, and one or more of the multiple user credentials are verified. The collection of multiple user credentials is also compared to a threshold combination of user credentials to be satisfied to access the resource, and a determination is made, based on the comparing and the verifying, as to whether access to the resource is permitted. An indication of whether access to the resource by a requesting user is permitted is returned or provided to another device.

20 Claims, 5 Drawing Sheets

RESOURCE ACCESS BASED ON MULTIPLE CREDENTIALS

BACKGROUND

As the use of computers and networks has increased, so too has the desire to restrict access to resources so that they can be accessed by only the appropriate users. Each user typically has his or her own user credentials that he or she can provide in order to prove his or her identity and to indicate whether he or she is entitled to access a particular resource. Access to the particular resource is then permitted or denied based on the user's identity. However, such reliance on a user's credentials is not without its problems. One such problem is that this use of user's credentials constrains designers on how they can restrict access to particular resources. This can lead to more rigid access control systems, and frustration on the part of both designers and users of computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a collection of multiple user credentials each associated with one of multiple different users is obtained at a device. One or more of the multiple user credentials are verified, and the collection of multiple user credentials is compared to a threshold combination of user credentials to be satisfied to access the resource. A determination is made, based on the comparing and the verifying, as to whether access to the resource is permitted, and an indication is provided of whether access to the resource by a requesting user is permitted.

BRIEF DESCRIPTION OF THE DRAWINGS

The same numbers are used throughout the drawings to reference like features.

DETAILED DESCRIPTION

Resource access based on multiple credentials is discussed herein. When a user requests access to a resource, a collection of multiple user credentials from multiple different users is collected. A determination is then made, based on this collection of multiple user credentials, whether the requester is permitted to access the resource. The multiple user credentials can include user credentials for the requester and/or user credentials of other users.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
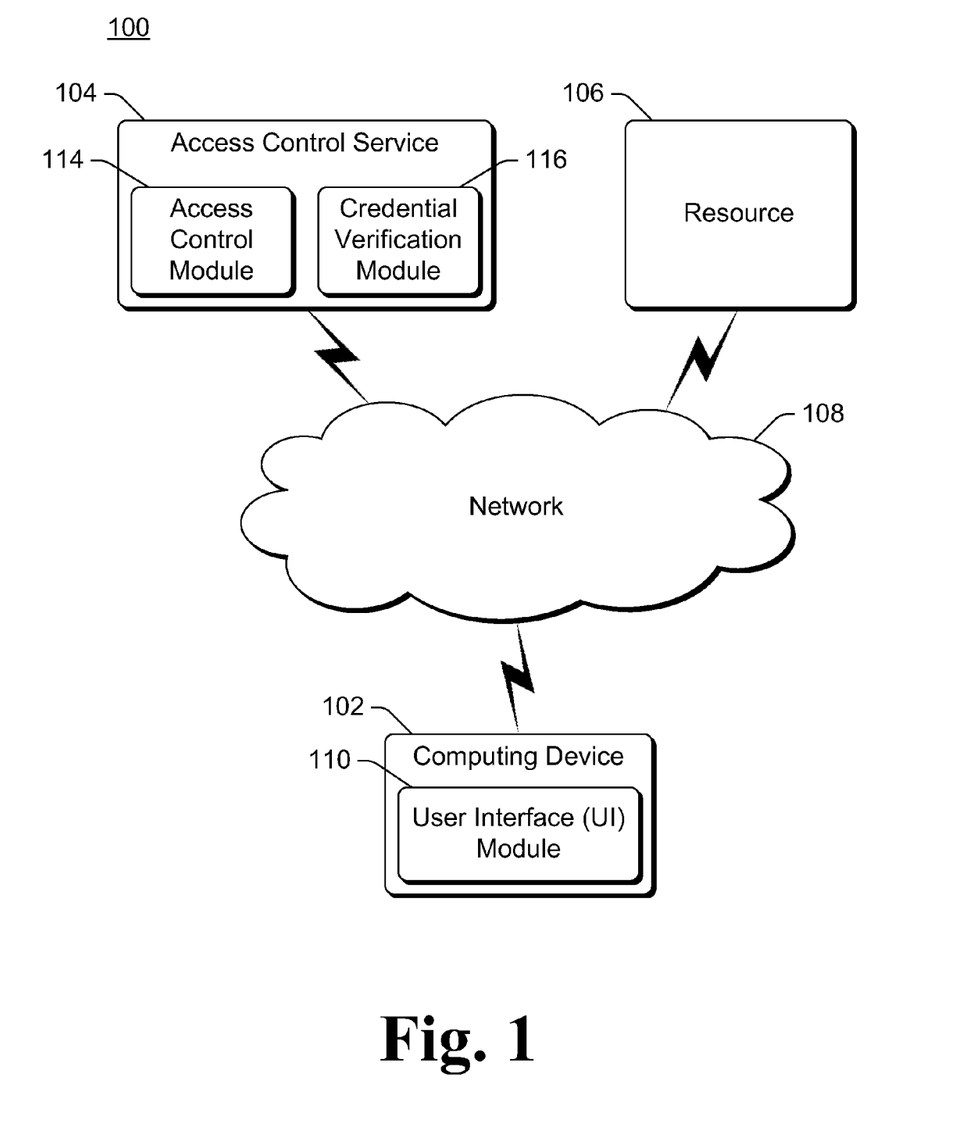
FIG. 1 illustrates an example system implementing the resource access based on multiple credentials in accordance with one or more embodiments.

FIG. 1 illustrates an example system 100 implementing the resource access based on multiple credentials in accordance with one or more embodiments. System 100 includes a computing device 102 that can communicate with an access control service 104 and a resource 106 via a network 108. Network 108 can be a variety of different networks, including the Internet, a local area network (LAN), a public telephone network, an intranet, other public and/or proprietary networks, combinations thereof, and so forth.

Computing device 102 can be a variety of different devices. For example, computing device 102 can be a desktop computer, a laptop or netbook computer, a mobile station, an entertainment appliance, a set-top box communicatively coupled to a display device, a television, a cellular or other wireless phone, a game console, an audio and/or video playback device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Computing device 102 includes a user interface (UI) module 110. UI module 110 manages a user interface for device 102, including receiving user inputs from a user of device 102 and displaying or otherwise presenting information to the user of device 102. User inputs can be provided in a variety of different manners, such as by a user pressing one or more keys of a keypad or keyboard of device 102, or pressing a particular portion of a touchpad or touchscreen of device 102. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners via other types of sensors, such as audible inputs via a microphone or other audio sensor, other physical feedback input to the device (e.g., tapping any portion of device 102 or another action that can be recognized by a motion detection component of device 102, such as shaking device 102, rotating device 102, etc.) via a motion or movement sensor, inputs via infrared sensors, inputs via light sensors, inputs via cameras or other image capture devices (e.g., fingerprint sensors), and so forth.

Additionally, UI module 110 can receive user inputs via another device or module. For example, one or more other modules of computing device 102, or devices coupled to or otherwise in communication with computing device 102, can receive user inputs and communicate the received user inputs to UI module 110. It should also be noted that user inputs can be received by UI module 110 (or another device or module) on behalf of the user without requiring a specific user input. For example, a location of the user can be identified as a user input (e.g., using Global Positioning System (GPS) coordinates or other wireless technologies), data on a smartcard (e.g., in the user's pocket) can be retrieved as a user input, and so forth.

In one or more embodiments, the current location of computing device 102 and/or other information received on behalf of the user is identified or otherwise obtained with the user's permission. A description of the information identified or otherwise obtained, how and/or why such information is identified or otherwise obtained, how such information is used by device 102, and the benefits of permitting such information to be identified or otherwise obtained can be displayed or otherwise presented to the user. The user can then opt-in to having such information identified or otherwise obtained on his or her behalf. Alternatively, the user can be given the option to opt-out of using such information, and such information is identified or otherwise obtained on the user's behalf unless the user opts-out of using such information. Accordingly, if the user desires to not have the current location of device 102 identified and/or other information obtained on his or her behalf, the user can easily instruct device 102 to not have such information identified or otherwise obtained.

In one or more embodiments, UI module 110 displays information on a screen of device 102. Such a screen can be implemented in a variety of different manners, such as using liquid crystal display (LCD) technology, plasma screen technology, image projection technology, and so forth. Alternatively, rather than including a screen, device 102 can generate one or more signals that are output to one or more other display devices which include a screen on which the information is displayed. In other embodiments, UI module 110 presents information in different manners, such as playing back audio content, physically moving device 102, and so forth.

A user of computing device 102 requests access to resource 106 by inputting, at computing device 102, a request to access resource 106. This request to access resource 106 can be input in a variety of different manners via UI module 110. Whether access to resource 106 is permitted in response to the user request is dependent at least in part on user credentials of multiple other users as discussed in more detail below. The user credentials of the other users can be entered via computing device 102, or alternatively via another computing device (e.g., analogous to computing device 102).

Resource 106 can be a variety of different types of resources to which a user of computing device 102 might request access. Although a single resource 106 is illustrated in FIG. 1, it is to be appreciated that system 100 can include multiple resources 106. Resource 106 can be a particular device, such as a particular computing device, a particular storage device (e.g., magnetic or optical disk drive), a particular input device (e.g., a scanner or camera, a microphone, a fax machine, etc.), and so forth. Resource 106 can also be an information resource. An information resource can be, for example, a service that is implemented on one or more computing devices. Such a service can be a network (e.g., a corporate LAN), a social network service, an online service (e.g., a merchant), and so forth. An information resource can also be, for example, a portion of a particular storage device (e.g., a file or folder on a disk).

Although resource 106 is illustrated as separate from computing device 102 and accessed via network 108, it is to be appreciated that resource 106 can take other forms. For example, resource 106 can be coupled directly to computing device 102 (e.g., via a wired or wireless connection). By way of another example, resource 106 can be computing device 102 (e.g., the resource that a user is requesting access to is computing device 102 itself).

Access control service 104 determines whether a requesting user is permitted to access a resource 106. This determination is made based on multiple user credentials of multiple different users, as discussed in more detail below. Access control service 104 can be implemented on one or more computing devices analogous to computing device 102.

Access control service 104 includes an access control module 114 and a credential verification module 116. Modules 114 and 116 can be implemented on the same computing device and/or different computing devices. Additionally, each of modules 114 and 116 can be implemented on a single computing device or implemented across multiple computing devices. Generally, access control module 114 receives requests to access resources 106, and responds to those requests with an indication of whether the user requesting to access the resource 106 is permitted to do so. Credential verification module 116 verifies multiple credentials received from multiple different users, and access control module 114 determines whether a requesting user is permitted to access the resource 106 based at least in part on the multiple credentials received from multiple different users.

Figure 2:
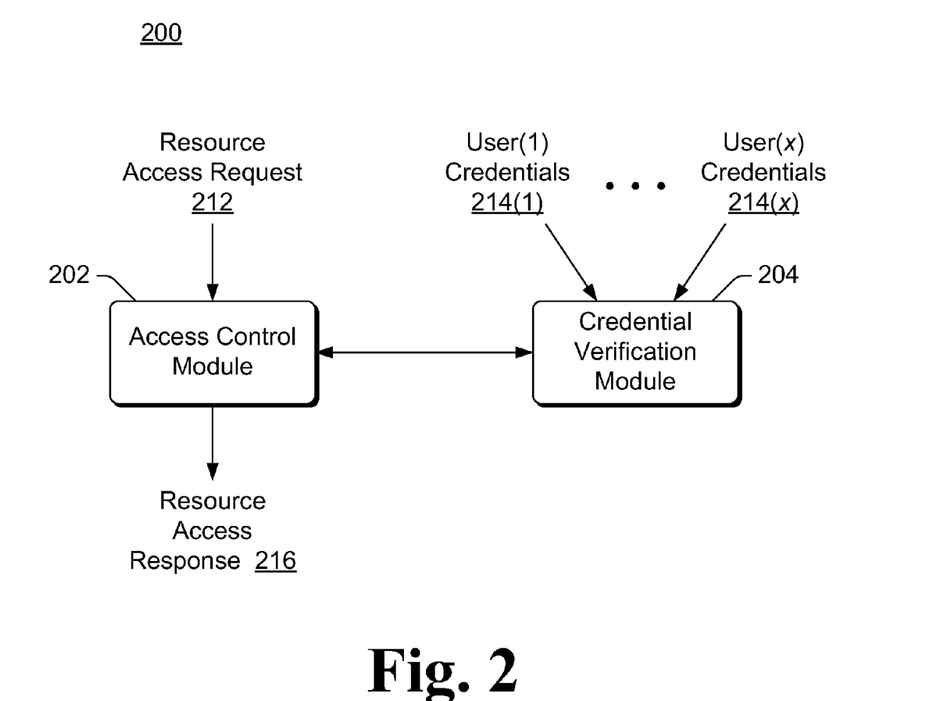
FIG. 2 is a block diagram illustrating an example access control system in accordance with one or more embodiments.

FIG. 2 is a block diagram illustrating an example access control system 200 in accordance with one or more embodiments. Access control system 200 can implement, for example, an access control service 104 of FIG. 1. Access control system 200 includes an access control module 202 and credential verification module 204, analogous to access control module 114 and credential verification module 116 of FIG. 1, respectively.

During operation, access control module 202 receives a user request 212 to access a resource. This user request can be received from, for example, a user of computing device 102 of FIG. 1. In response to the user request, access control module 202 communicates with credential verification module 204, which verifies the multiple user credentials 214(1), . . . , 214(x) that module 204 obtains. Credential verification module 204 can receive user credentials 214 as part of the user request, or alternatively can obtain user credentials 214 in other manners. For example, in response to a user request to access a resource, credential verification module 204 can request (e.g., via user interface module 110 of computing device 102 of FIG. 1) the user credentials 214 from the different users. It should be noted that at least part of credential verification module 204 can be implemented by a component or device that collects a user credential (e.g., a fingerprint scanner can verify a scanned fingerprint and provide an indication to another portion of module 204 implemented on another device of whether the user credential is verified).

Credential verification module 204 provides to access control module 202 an indication of whether the obtained user credentials 214 are verified. Access control module 202 uses this indication from credential verification module 204, as well as other information, to determine whether the user requesting access to the resource is permitted to access the resource. Access control module 202 then provides a resource access response 216 indicating whether the user requesting access to the resource is permitted to access the resource.

User credentials 214 identify a particular user, and a variety of different types of user credentials 214 can be used. For example, user credentials 214 can be a user id and password entered by the user, a digital certificate and/or other identifying data obtained from a smartcard of the user, biometric data entered by the user, biometric data measured by the computing device (e.g., device 102 of FIG. 1) or otherwise collected or captured by the computing device, a particular order in which biometric or other data is entered by the user (or otherwise is collected or captured), combinations thereof, and so forth. It should be noted that a variety of different biometric data can be captured or collected by the computing device, such as scans of a fingerprint, retina, face, veins, gait, and so forth of a user. Different users can have the same type of user credentials 214, or alternatively different types of user credentials 214.

User credentials 214 can come from a variety of different sources. In one or more embodiments, different users input their respective user credentials 214 via the same computing device (e.g., computing device 102 of FIG. 1). Alternatively, different users can input their respective user credentials 214 via different computing devices.

Credential verification module 204 verifies the received user credentials 214. The manner in which module 204 verifies the received user credentials can vary based at least in part on the type of user credentials. In one or more embodiments, credential verification module 204 is programmed with or otherwise configured with an indication of the manner in which user credentials are to be verified. In other embodiments, a separate record or data store accessible to credential verification module 204 is maintained and identifies the manner in which user credentials are to be verified for one or more resources.

In one or more embodiments, credential verification module 204 accesses a trusted data store (not shown) to obtain information used to verify the credentials. For example, if a user credential 214 is a user id and password, then module 204 can access a data store to obtain stored passwords and user ids, and verifies that the stored password and user id combination matches the user id and password provided as user credential 214. By way of another example, if a user credential is a particular order in which biometric or other data is entered by the user, then module 204 can access a data store to obtain the correct order and verify that the biometric or other data was entered in the correct order by the user. By way of yet another example, the user credential 214 can be a data structure including an identifier of the user (such as a username or biometric measurement or characteristic) and the data structure can be digitally signed using the private key of a public/private key pair of the user. Credential verification module 204 can verify the digital signature using the public key of the public/private key pair of the user.

Additionally, in one or more embodiments credential verification module 204 uses multiple user credentials from the same user in order to verify the user credentials for that user. For example, in order to verify particular user credentials module 204 may require a user id, a password, and a digital certificate obtained from a smartcard of the user. By way of another example, in order to verify particular user credentials module 204 may require a user id, a password, and three fingerprints from the user input in the correct order (e.g., in the order of right thumb, left index finger, left thumb).

When using multiple user credentials from the same user in order to verify the user credentials for a user, the particular combination or combinations that module 204 is to use to verify the user credentials for the user can be identified in a variety of different manners (e.g., as discussed above with respect to the manner in which module 204 verifies the received user credentials). Alternatively, different user credentials can be associated with different validity probabilities or confidence levels, and different combinations of these user credentials can be provided by a user. Credential verification module 204 verifies the user credentials for that user if the combination of different user credentials has at least a threshold validity probability or confidence level. The particular threshold validity probability or confidence level can be identified in a variety of different manners (e.g., as discussed above with respect to the manner in which module 204 verifies the received user credentials).

In one or more embodiments, credential verification module 204 also uses information regarding the sources (e.g., computing devices) of the user credentials in order to verify the user credentials for a user. This information regarding the sources can be characteristics of the sources, characteristics of a communication channel between the sources and access control system 200, and so forth. For example, the information regarding the sources can include the location of the source, a network that the source is coupled to, a measurement of the health of the source (e.g., how well a computing device is running, whether an up-to-date anti-virus program is running on a computing device, etc.), whether the source allows a user to passively or actively respond to a challenge, and so forth. This information regarding the sources can be obtained from the sources themselves, or alternatively elsewhere (e.g., from a table or list maintaining the information). Credential verification module 204 can determine that the user credentials for a user are verified in different manners based at least in part on the information regarding the sources. For example, module 204 can use different user credentials for different source locations or depending on whether the source allows a user to passively or actively respond to a challenge, use different credentials for different networks to which a source may be coupled, and so forth.

Additionally, in one or more embodiments credential verification module 204 performs a risk assessment in verifying the user credentials for a user. The risk assessment is an indication of the reliability of a particular source (e.g., computing device) and/or communication channel. Credential verification module 204 can impose more stringent constraints on verifying user credentials for sources deemed to be less reliable. For example, module 204 can determine that the user credentials for a user are verified in one manner if the user credentials are received from a computing device on the same corporate network as access control system 200, and in a different manner (e.g., requiring a higher threshold validity probability or confidence level) if the user credentials are received from a computing device coupled to access control system 200 via the Internet.

Access control module 202 determines whether the user from which resource access request 212 is received is permitted to access the desired resource based at least in part on the multiple user credentials 214. Module 202 can receive user credentials 214 from credential verification module 204, or alternatively from another source (e.g., the same device or module from which credential verification module 204 received the credentials). Alternatively, credential verification module 204 can provide to access control module 202 identifiers or other indicators of the users for which user credentials 214 are provided rather than the user credentials themselves.

Whether access to a particular resource is permitted is dependent on user credentials 214 and an indication of a threshold combination of user credentials that is to be satisfied in order to access the particular resource. Each resource can have its own threshold combination of user credentials that is to be satisfied in order to permit access to the resource, or access control module 202 can use the same threshold combination of user credentials for multiple resources.

The threshold combination of user credentials that is to be satisfied in order to access a particular resource can take one or more of a variety of different forms. In one or more embodiments, the threshold combination is a threshold number of user credentials 214 from a threshold number of different users that are to be obtained and verified. For example, the threshold combination can be that at least three user credentials 214 from three different users are verified by credential verification module 204. In other embodiments, the threshold combination is that one or more users having user credentials 214 are to have particular user identifiers or be members of particular groups of users. A particular user identifier can be identified in different manners, such as being included as part of the user credentials 214 for that user. A group that a user is a member of can be identified in different manners, such as being included as part of the user credentials 214 for that user, being maintained in a separate list or record of users, and so forth.

It should be noted that the threshold combination of user credentials can include that user credentials for the user submitting resource access request 212 be included as one of user credentials 214. Thus, in order to be permitted access to a particular resource, the user requesting access to the resource is to provide his or her user credentials. Alternatively, user credentials for the user submitting resource access request 212 can be excluded from user credentials 214. Thus, a user can request and be permitted access to a particular resource based on the user credentials 214 of other users rather than his or her own user credentials.

The threshold combination of user credentials that is to be satisfied in order to access a particular resource can be identified in a variety of different manners. In one or more embodiments, access control module 202 is programmed with or otherwise configured with an indication of the threshold combination of user credentials. In other embodiments, each resource has an associated descriptor or other metadata identifying the threshold combination of user credentials. Access control module 202 obtains and uses this associated descriptor or other metadata to determine the threshold combination of user credentials for that resource.

In other embodiments, the threshold combination of user credentials is identified based on a user's credentials. For example, the user credentials (e.g., a digital certificate) of the user requesting access to the resource can include an indication of the threshold combination of user credentials. By way of another example, a separate record can be maintained of the threshold combination of user credentials for different users. In yet other embodiments, the threshold combination of user credentials is maintained in a separate record or database. This record or database can be accessed and used by access control module 202 to identify the threshold combination of user credentials that is to be satisfied in order to access a particular resource.

Additionally, it should be noted that the threshold combination of user credentials can be identified in a combination of multiple different manners. For example, the threshold combination of user credentials that is to be satisfied in order to access a particular resource can be determined based on both a descriptor associated with the particular resource and based on the credentials of the user requesting access to the particular resource.

In one or more embodiments, the threshold combination of user credentials can vary based on a risk assessment (similar to the risk assessment in verifying the user credentials discussed above). In order to access a particular resource, different threshold combinations of user credentials can be required for different risk assessments. For example, user credentials of user ids and passwords can be sufficient to satisfy the threshold combination if the user credentials are received from a computing device on the same corporate network as access control system 200, but user credentials of smartcards are needed to satisfy the threshold combination if the user credentials are received from a computing device coupled to access control system 200 via the Internet. By way of another example, user credentials of a single user's smart card can be sufficient to satisfy the threshold combination if the user credentials are received from a computing device in an area deemed secure by access control system 200, but user credentials of four different users' smart cards are needed to satisfy the threshold combination if the credentials are received from a computing device not in an area deemed secure by access control system 200.

If the user credentials 214 are verified and the threshold combination of user credentials are satisfied, then access control module 202 provides a resource access response 216 indicating that access to the resource by the user is permitted. However, if the user credentials are not verified and/or the threshold combination of user credentials are not satisfied, then access control module 202 provides a resource access response 216 indicating that access to the resource by the user is not permitted (is denied).

In one or more embodiments, if access to the resource by the user is not permitted, access control module 202 also provides an indication of why the threshold combination of user credentials was not satisfied and/or what can be provided to access control system 200 in order for access to the resource by the user to be permitted. Information can then be displayed to a user informing the user of what additional user credentials are to be provided to access control system 200 in order to be granted access to the resource. For example, if the threshold combination to access a particular resource is verified user credentials from three different users, and verified user credentials from only two different users have been obtained, then access control module 202 can return an indication that verified user credentials from one additional user are to be input in order to access the particular resource. The user can thus be presented with information informing him or her that he or she is to have one additional user input user credentials for verification in order to access the particular resource.

Additionally, in one or more embodiments, resource access response 216 is provided to the device from which resource access request 212 was received (e.g., computing device 102 of FIG. 1). Alternatively (or additionally), resource access response 216 can be provided to other devices or modules, such as the resource to which access is requested.

It should be noted that in one or more embodiments all user credentials 214 that are received are to be verified in order for access control module 202 to indicate that access to the requested resource is permitted. If one or more user credentials are not satisfied then access control module 202 provides a resource access response 216 indicating that access to the resource by the user is not permitted. Alternatively, access control module 202 can indicate that access to the resource by the user is permitted even if one or more user credentials are not satisfied, so long as the threshold combination of user resources is still satisfied. For example, assume that five user credentials 214 are obtained by credential verification module 204 and only three of those five user credentials 214 are verified by module 204. If the threshold combination of user resources is satisfied by three user credentials, then access control module 202 provides a resource access response 216 indicating that access to the resource by the user is permitted.

Access control module 202 provides an indication of whether access to the requested resource is permitted. Another device or module (e.g., the resource itself) typically enforces this access based on the response 216 provided by access control module 202, either allowing the user requesting access to the resource to access the resource or preventing the user requesting access to the resource from accessing the resource. Alternatively, access to the resource can be enforced by access control system 200.

Figure 3:
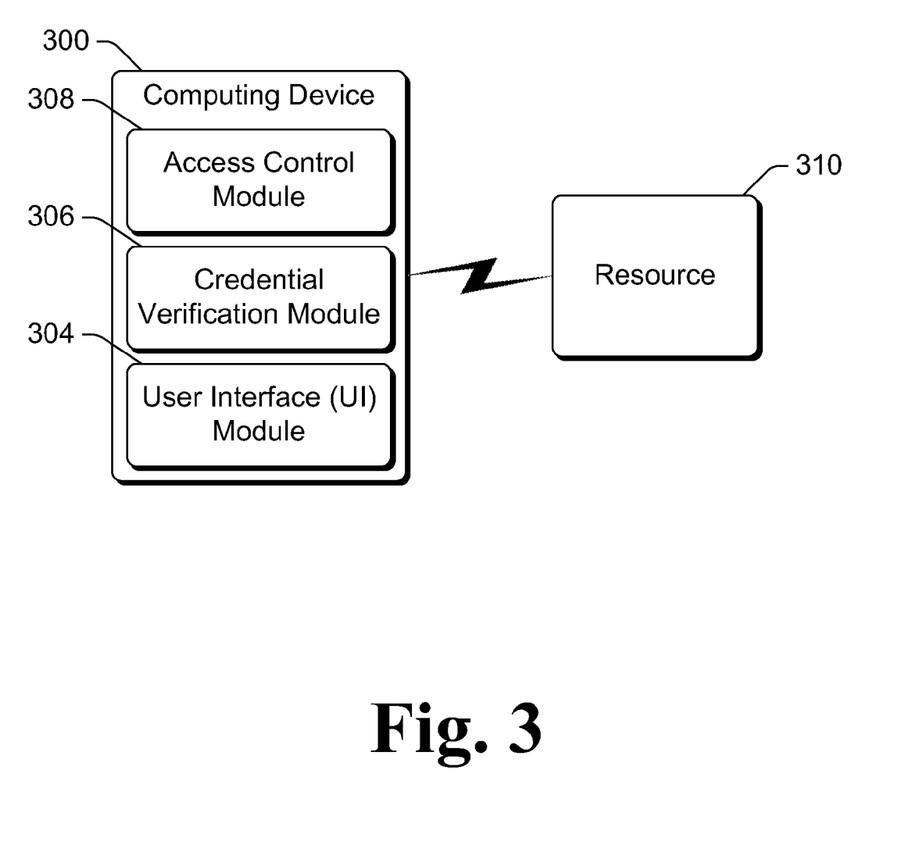
FIG. 3 illustrates an example computing device implementing the resource access based on multiple credentials in accordance with one or more embodiments.

FIG. 3 illustrates an example computing device 300 implementing the resource access based on multiple credentials in accordance with one or more embodiments. Computing device 300 includes a user interface (UI) module 304, a credential verification module 306, and an access control module 308. Computing device 300 is similar to computing device 102 of FIG. 1, and can be a variety of different computing devices analogous to computing device 102 of FIG. 1. Computing device 300 includes a user interface module 304, analogous to user interface module 110 of FIG. 1.

Computing device 300 also includes credential verification module 306 and access control module 308, analogous to credential verification module 204 and access control module 202 of FIG. 2, respectively. Computing device 300 operates similar to computing device 102 of FIG. 1, except that the credential verification and access determination performed by modules 306 and 308 is performed at computing device 300 rather than at a remote access control service. Accordingly, the access control service is provided by computing device 300 itself.

A user of computing device 300 can request access to a particular resource 310, analogous to resource 106 of FIG. 1. Additionally, computing device 300 itself can be the resource 310 to which the user requests access.

Figure 4:
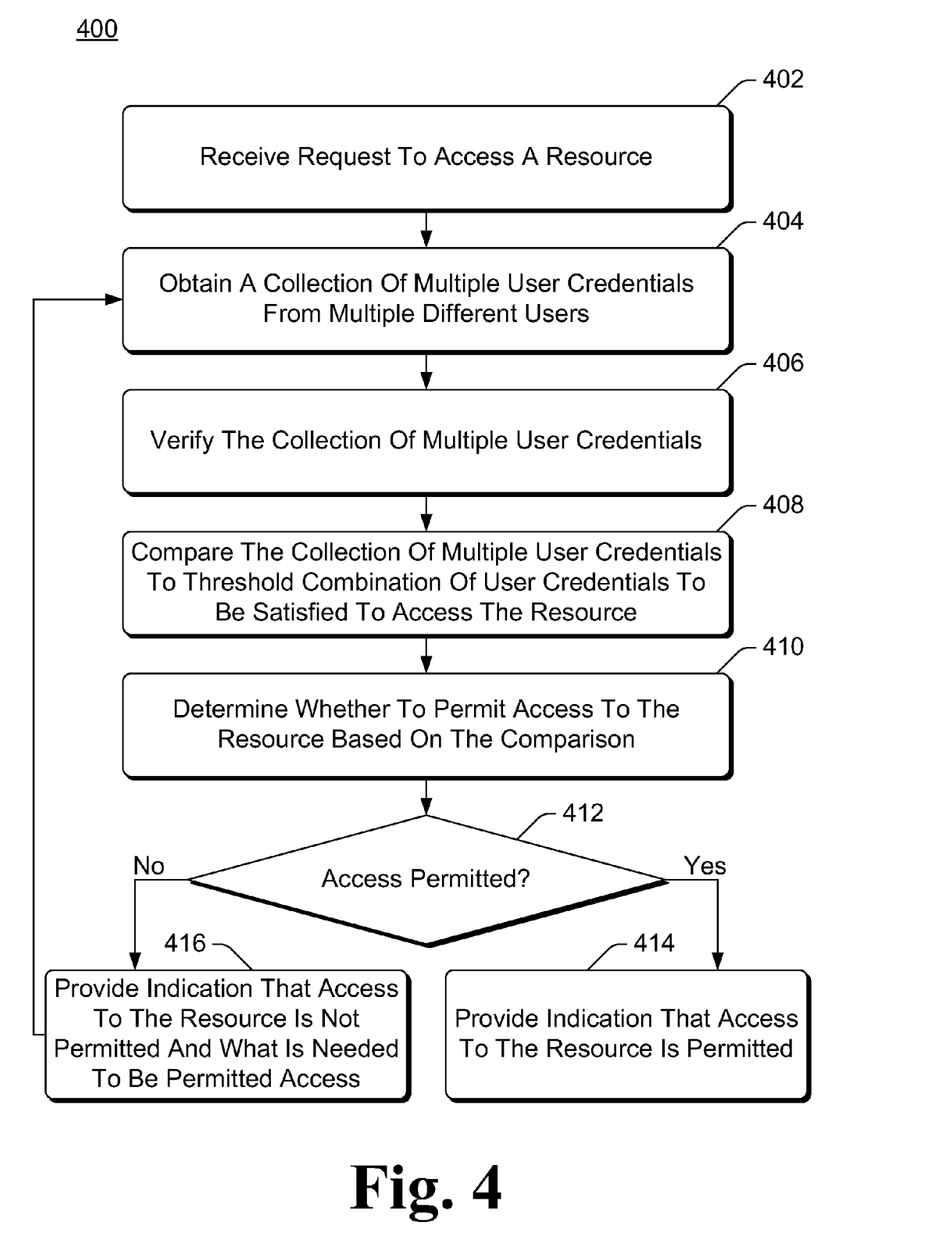
FIG. 4 is a flowchart illustrating an example process for resource access based on multiple credentials in accordance with one or more embodiments.

FIG. 4 is a flowchart illustrating an example process 400 for resource access based on multiple credentials in accordance with one or more embodiments. Process 400 is carried out by a device or service, such as device 300 of FIG. 3 or access control service 104 of FIG. 1, and can be implemented in software, firmware, hardware, or combinations thereof. Process 400 is shown as a set of acts and is not limited to the order shown for performing the operations of the various acts. Process 400 is an example process for resource access based on multiple credentials; additional discussions of resource access based on multiple credentials are included herein with reference to different figures.

In process 400, a request to access a resource is received (act 402). This request is typically a request received from a user of a particular computing device, although alternatively can be received from another component or module. Access to a variety of different resources can be requested as discussed above, including the computing device via which the user inputs the request.

A collection of multiple user credentials are obtained from multiple different users (act 404). A variety of different types of user credentials can be obtained from a variety of different sources as discussed above.

The collection of multiple user credentials is verified (act 406). One or more of the multiple user credentials in the collection are verified as discussed above.

The collection of multiple user credentials is compared to a threshold combination of user credentials that is to be satisfied in order to access the resource (act 408). This threshold combination of user credentials can take a variety of different forms as discussed above, such as a threshold number of user credentials and/or particular user identifiers that a user is to have and/or a group that a particular user is to be a member of. Additionally, this threshold combination of user credentials can change based on a risk assessment of the sources of the user credentials as discussed above.

A determination is made whether to permit access to the resource based on the comparison (act 410). This determination is also based at least in part on the verification performed in act 406 as discussed above.

Process 400 proceeds, based on whether access to the resource is permitted (act 412), as determined in act 410. If access to the resource is permitted, then an indication that access to the resource is permitted is provided (act 414). This indication can be provided to the user from which the request was received in act 402 (or the computing device being used by that user), and/or to another device or module as discussed above.

However, if access to the resource is not permitted, then both an indication that access to the resource is not permitted and an indication of what is needed in order for access to be permitted is provided (act 416). These indication can be provided to the user from which the request was received in act 402 (or the computing device being used by that user), and/or to another device or module as discussed above. Process 400 then returns to act 404 to obtain additional credentials to be verified in order to obtain access to the resource. Alternatively, if no additional credentials are obtained in act 404 (e.g., no additional user credentials are provided by a user), then process 400 ends without access to the resource being permitted.

The resource access based on multiple credentials discussed herein provides for a variety of different usage scenarios. For example, a particular user can request access to a particular service, but be allowed to access that particular service only if another user (e.g., a parent, a supervisor, etc.) indicates that such access is to be permitted. The other user can indicate that such access is to be permitted by providing his or her user credentials. Accordingly, the access control service permits the requesting user to access the particular service only if the user credentials of the requesting user and the user credentials of the other user are provided to the access control service.

By way of another example, assume that a first user forgets his or her password to access a corporate network. The access control service can be configured so that a user is permitted to access the corporate network (e.g., and reset his or her password) if at least three other users that are verified as being permitted to access the corporate network vouch for the first user. Accordingly, the first user can request access to the corporate network and have three co-workers provide their user credentials on his behalf. The access control service then permits the first user to access the corporate network with his or her user identifier (but without his or her password) if at least three co-workers provide their user credentials to the access control service.

Continuing with this example, the access control service can be configured to employ risk assessment to determine whether the user is permitted to access the corporate network. For example, if the user is requesting access to the corporate network from a computing device on the corporate network, then the user is permitted to access the corporate network if at least three other users that are verified as being permitted to access the corporate network vouch for the first user. However, if the user is requesting access to the corporate network from a computing device accessing the corporate network via the Internet then the user is not permitted to access the corporate network with at least three other users that are verified as being permitted to access the corporate network vouching for the first user, but can access the corporate network if a user verified as a corporate security officer vouches for the first user.

Figure 5:
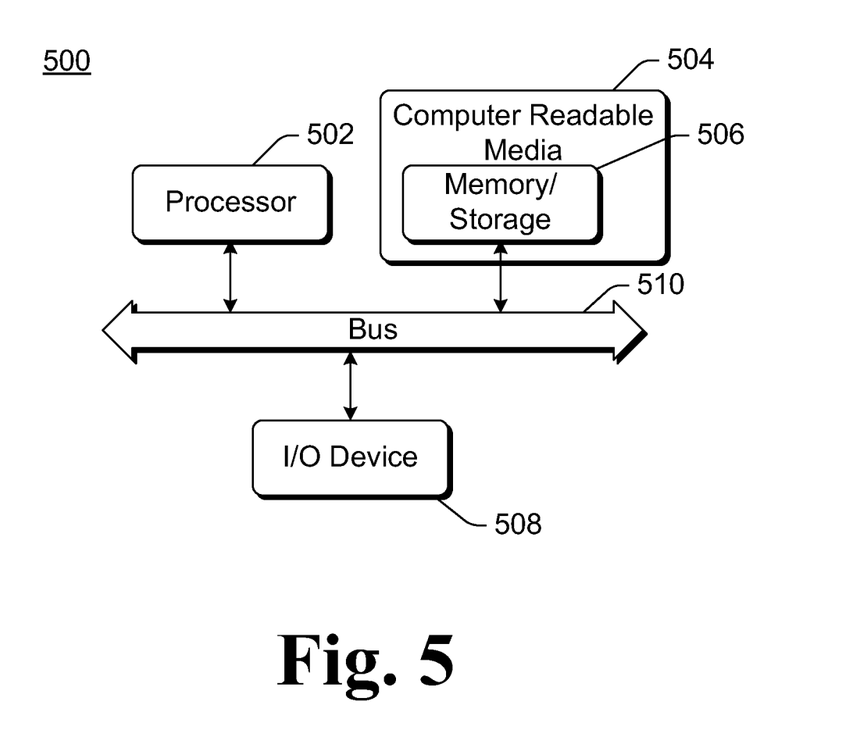
FIG. 5 illustrates an example computing device that can be configured to implement the resource access based on multiple credentials in accordance with one or more embodiments.

FIG. 5 illustrates an example computing device 500 that can be configured to implement the resource access based on multiple credentials in accordance with one or more embodiments. Computing device 500 can be, for example, computing device 102 of FIG. 1, computing device 300 of FIG. 3, or can implement access control service 104 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time. Furthermore, it should be noted that instructions can also be stored on other devices, such as a device that collects user credentials (e.g., a device that collects a fingerprint can contain instructions that can be executed by processing unit 502 (or a processing unit or controller of the device) to verify the fingerprint).

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the resource access based on multiple credentials techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining, at a first device, a collection of multiple user credentials each associated with one of multiple different users;
    verifying one or more of the multiple user credentials, the verifying including using device characteristics of one or more computing devices from which the one or more of the multiple user credentials are obtained and using characteristics of a communication channel between the one or more computing devices and the first device;

comparing the collection of multiple user credentials to a threshold combination of user credentials that is to be satisfied in order to access a resource;

determining, based on the comparing and the verifying, whether access to the resource is permitted; and providing an indication of whether access to the resource by a requesting user is permitted.

2. A method as recited in claim 1, the obtaining comprising obtaining the collection of multiple user credentials in response to a user request to access the resource, the user request being received at a second device remote from the first device.

3. A method as recited in claim 2, wherein the collection of multiple user credentials includes user credentials of a user from which the user request is received.

4. A method as recited in claim 2, wherein the collection of multiple user credentials includes user credentials of multiple users vouching for a user from which the user request is received but excludes user credentials of the user from which the user request is received.

5. A method as recited in claim 1, the obtaining comprising obtaining the collection of multiple user credentials in response to a user request to access the resource.

6. A method as recited in claim 1, wherein the threshold combination of user credentials that is to be satisfied in order to access the resource includes that at least a threshold number of user credentials from at least a threshold number of different users are to be obtained.

7. A method as recited in claim 1, wherein the threshold combination of user credentials that is to be satisfied in order to access the resource includes that at least one user having one of the multiple user credentials is to be a member of a particular group of users.

8. A method as recited in claim 1, wherein a request received from the requesting user is a request to access the resource without providing user credentials for the requesting user, and wherein the collection of multiple user credentials are user credentials of multiple different users that are vouching for the requesting user.

9. A method as recited in claim 1, wherein the resource is one of multiple resources, and wherein different resources of the multiple resources have different threshold combinations of user credentials that are to be satisfied in order to access respective resources.

10. A method as recited in claim 9, wherein the threshold combination of user credentials that is to be satisfied in order to access a particular one of the multiple resources is included in metadata associated with the particular one of the multiple resources.

11. A method as recited in claim 1, wherein verifying one of the multiple user credentials comprises verifying that biometric data is collected in a particular order.

12. A method as recited in claim 1, wherein the threshold combination of resources depends at least in part on a risk assessment of one or more sources of the collection of multiple user credentials.

13. A method as recited in claim 1, wherein different user credentials of the multiple user credentials are different types of user credentials.

14. One or more computing devices implementing an access control system, the access control system comprising:

a credential verification module configured to:
receive a collection of multiple user credentials; and
verify one or more of the multiple user credentials by at least using characteristics of a communication channel between the access control system and one or more computing devices from which the one or more of the multiple user credentials are received, each of the multiple user credentials being associated with one of multiple different users; and an access control module configured to:
receive an indication of whether the one or more of the multiple user credentials are verified by the credential verification module;
compare the one or more of the multiple user credentials to a threshold combination of user credentials that is to be satisfied in order to access a resource;
determine based on the comparison whether access to the resource is permitted; and
permit access to the resource for a user, from which a user request to access the resource is received, in an event that user credentials associated with the user lack at least a portion of the user credentials, the access being permitted based on a threshold number of other valid user credentials that are associated with other users being in the collection of multiple user credentials, and which are provided on behalf of the user to vouch for the user.

15. One or more computing devices as recited in claim 14, wherein the resource comprises the one or more computing devices.

16. One or more computing devices as recited in claim 14, wherein the credential verification module is to receive the collection of multiple user credentials in response to a user request to access the resource, the user request being received at a device remote from the one or more computing devices.

17. One or more computing devices as recited in claim 14, wherein the collection of multiple user credentials includes user credentials of multiple users vouching for a user from which a user request to access the resource is received but excludes user credentials of the user from which the user request to access the resource is received, and wherein the access control module is further to determine whether the user is permitted to access the resource.

18. One or more computing devices as recited in claim 14, wherein the threshold combination of user credentials that is to be satisfied in order to access the resource includes that at least a threshold number of user credentials from at least a threshold number of different users are to be obtained.

19. One or more computing devices as recited in claim 14, wherein the resource is one of multiple resources, and wherein different resources of the multiple resources have different threshold combinations of user credentials that are to be satisfied in order to access respective resources.

20. One or more hardware computer storage media having stored instructions that, when executed by one or more processors of a first computing device, cause the one or more processors to:

receive a request from a requesting user to access a resource;

obtain a collection of multiple user credentials each associated with one of multiple different users;

verify the multiple user credentials by at least using device characteristics of one or more computing devices from which the multiple user credentials are obtained and using characteristics of a communication channel between the one or more computing devices and the first computing device;

compare the collection of multiple user credentials to a threshold combination of user credentials that is to be satisfied in order to access the resource, the comparison of the collection of multiple user credentials to the threshold combination of user credentials including a check of whether the collection of multiple user credentials includes at least a threshold number of user credentials from at least a threshold number of different users;

determine, based on the comparison and the verification, whether the requesting user is permitted to access the resource, the user being permitted to access the resource in an event that user credentials associated with the user are invalid but the threshold combination of user credentials is satisfied by valid user credentials that are associated with other users being included in the collection of multiple user credentials, and which vouch for the user;

in an event that the requesting user is permitted to access the resource, provide an indication that the requesting user is permitted to access the resource to the resource; and in an event that the requesting user is not permitted to access the resource, provide for the requesting user both an indication that the requesting user is not permitted to access the resource and an indication of what is needed in order for the requesting user to be permitted to access the resource.

* * * * *